United States Patent
VanDenberg et al.

(10) Patent No.: US 6,846,016 B2
(45) Date of Patent: Jan. 25, 2005

(54) TRAILER LANDING GEAR

(75) Inventors: Ervin VanDenberg, Massillon, OH (US); Josè Manuel AlgüeráGallego, Aschaffenburg (DE); Gerald Müller, Oberishausen (DE); Steffen Pfister, Langen (DE)

(73) Assignee: Jost-Werke GmbH & Co. KG, Frankfurt (DE)

( * ) Notice: Subject to any disclaimer, the term of this patent is extended or adjusted under 35 U.S.C. 154(b) by 0 days.

(21) Appl. No.: 10/238,540

(22) Filed: Sep. 10, 2002

(65) Prior Publication Data

US 2003/0006599 A1 Jan. 9, 2003

Related U.S. Application Data

(62) Division of application No. 09/491,425, filed on Jan. 26, 2000, now abandoned.

(51) Int. Cl.$^7$ ................................................. B60S 9/06
(52) U.S. Cl. ............................. 280/763.1; 280/766.1; 254/419; 248/188.2; 248/354.7
(58) Field of Search ................................ 280/475, 762, 280/763.1, 766.1, 764.1; 254/103, 419, 424, 425; 248/422, 188.2, 354.7

(56) References Cited

U.S. PATENT DOCUMENTS

| | | | |
|---|---|---|---|
| 252 A | 6/1837 | Nelson et al. | |
| 1,686,989 A | 10/1928 | Ridley | |
| 2,232,187 A | 2/1941 | Reid | |
| 2,747,422 A | 5/1956 | Walther | |
| 2,815,962 A | 12/1957 | McKay | |
| 2,885,220 A | 5/1959 | Dalton | |
| 2,977,094 A | * 3/1961 | McKay | ........................ 254/419 |
| 3,010,699 A | 11/1961 | McKay | |
| 3,033,522 A | 5/1962 | McKay | |
| 3,136,527 A | 6/1964 | Griffis | |
| 3,201,086 A | 8/1965 | Dalton | |
| 3,236,501 A | 2/1966 | McKay | |
| 3,240,300 A | 3/1966 | McKay | |
| 3,259,364 A | * 7/1966 | Hulverson et al. | .......... 254/419 |
| 3,436,987 A | 4/1969 | Baxter | |
| 3,518,890 A | 7/1970 | Eastman | |
| 3,596,877 A | 8/1971 | Eastman | |
| 3,632,086 A | 1/1972 | Mai | |

(List continued on next page.)

FOREIGN PATENT DOCUMENTS

| | | |
|---|---|---|
| DE | 42 21 958 C1 | 11/1993 |
| DE | 196 16 704 A1 | 10/1997 |
| EP | 0 675 029 A1 | 10/1995 |
| EP | 1 350 701 A2 | 10/2003 |
| GB | 122401 | 8/1919 |
| WO | WO 0009372 | 2/2000 |

OTHER PUBLICATIONS

Power to Spare for the Easiest Landings Anywhere—Jost Landing Gear.

*Primary Examiner*—Christopher P. Ellis
*Assistant Examiner*—Bridget Avery
(74) *Attorney, Agent, or Firm*—Sand & Sebolt

(57) ABSTRACT

A landing gear assembly for a semitrailer includes a pair of legs that may be simultaneously raised or lowered by turning a single crank. Each of the legs is configured to be able to be mounted in either an inboard or outboard configuration. This is achieved by providing both sides of each leg with no protrusions that extend beyond the space provided in the mounting bracket and the mounting hole used to connect the landing gear to the semitrailer. The gear assembly of the landing gear includes a unique floor base that receives and supports the input shaft. A cover is used to support the input ends of the input shaft and the output shaft. The cover is connected to the input side of the upper tube of the leg and allows the gear assembly to be easily assembled within the perimeter of the upper leg.

23 Claims, 11 Drawing Sheets

U.S. PATENT DOCUMENTS

| | | | |
|---|---|---|---|
| 3,675,497 A | | 7/1972 | Thomas |
| 3,726,543 A | * | 4/1973 | Dalton .................... 280/766.1 |
| 3,807,756 A | * | 4/1974 | Glassmeyer ............. 280/766.1 |
| 3,861,648 A | | 1/1975 | Glassmeyer |
| 3,892,141 A | | 7/1975 | Phillips, Jr. et al. |
| 3,976,310 A | * | 8/1976 | Carr ....................... 280/766.1 |
| 4,004,830 A | | 1/1977 | Belke |
| 4,124,225 A | | 11/1978 | Lozada et al. |
| 4,187,733 A | | 2/1980 | Walther et al. |
| 4,205,824 A | | 6/1980 | Mai |
| 4,270,783 A | | 6/1981 | Sorensen et al. |
| 4,281,852 A | * | 8/1981 | Konkle ................... 280/766.1 |
| 4,466,637 A | * | 8/1984 | Nelson ................... 280/766.1 |
| 4,482,039 A | | 11/1984 | Harris |
| 4,634,144 A | | 1/1987 | Ringe |
| 4,824,136 A | | 4/1989 | Baxter |
| 4,863,184 A | | 9/1989 | Mena |
| 4,871,188 A | | 10/1989 | Baxter |
| 4,875,821 A | | 10/1989 | Oren |
| 4,889,357 A | | 12/1989 | Perry |
| 4,903,977 A | | 2/1990 | Baxter |
| 4,905,953 A | | 3/1990 | Wilson |
| 4,919,234 A | | 4/1990 | Pearson et al. |
| 4,921,269 A | | 5/1990 | Scully |
| 4,923,175 A | | 5/1990 | Bentrup |
| 4,955,450 A | | 9/1990 | Deinlein-Kalb et al. |
| 5,199,738 A | | 4/1993 | VanDenberg |
| 5,238,266 A | * | 8/1993 | VanDenberg ............ 280/766.1 |
| 5,409,251 A | * | 4/1995 | Thorndyke ................. 280/475 |
| 5,435,523 A | * | 7/1995 | Hying et al. ................ 254/420 |
| 5,451,080 A | * | 9/1995 | Kneile ..................... 248/354.1 |
| 5,538,225 A | * | 7/1996 | VanDenberg ................ 254/419 |
| 5,676,018 A | * | 10/1997 | VanDenberg ................ 74/373 |
| 5,730,455 A | * | 3/1998 | Varnum et al. ............. 280/475 |
| 5,911,437 A | * | 6/1999 | Lawrence ................ 280/766.1 |
| 6,099,016 A | * | 8/2000 | Peveler ....................... 280/475 |
| 6,141,997 A | * | 11/2000 | Blehi, III ....................... 70/56 |
| 6,684,726 B2 | * | 2/2004 | Schmidt et al. ............... 74/342 |

* cited by examiner

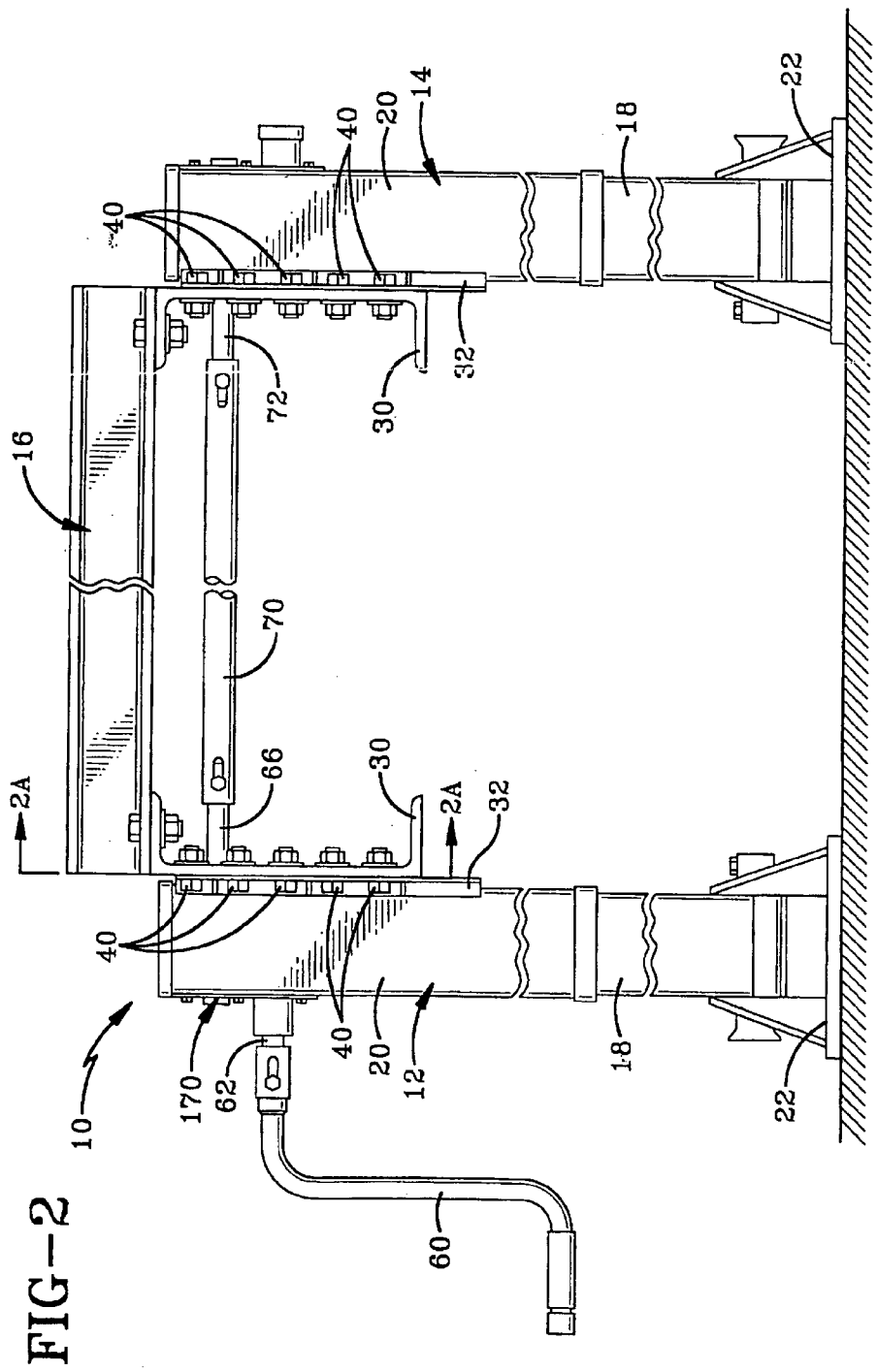

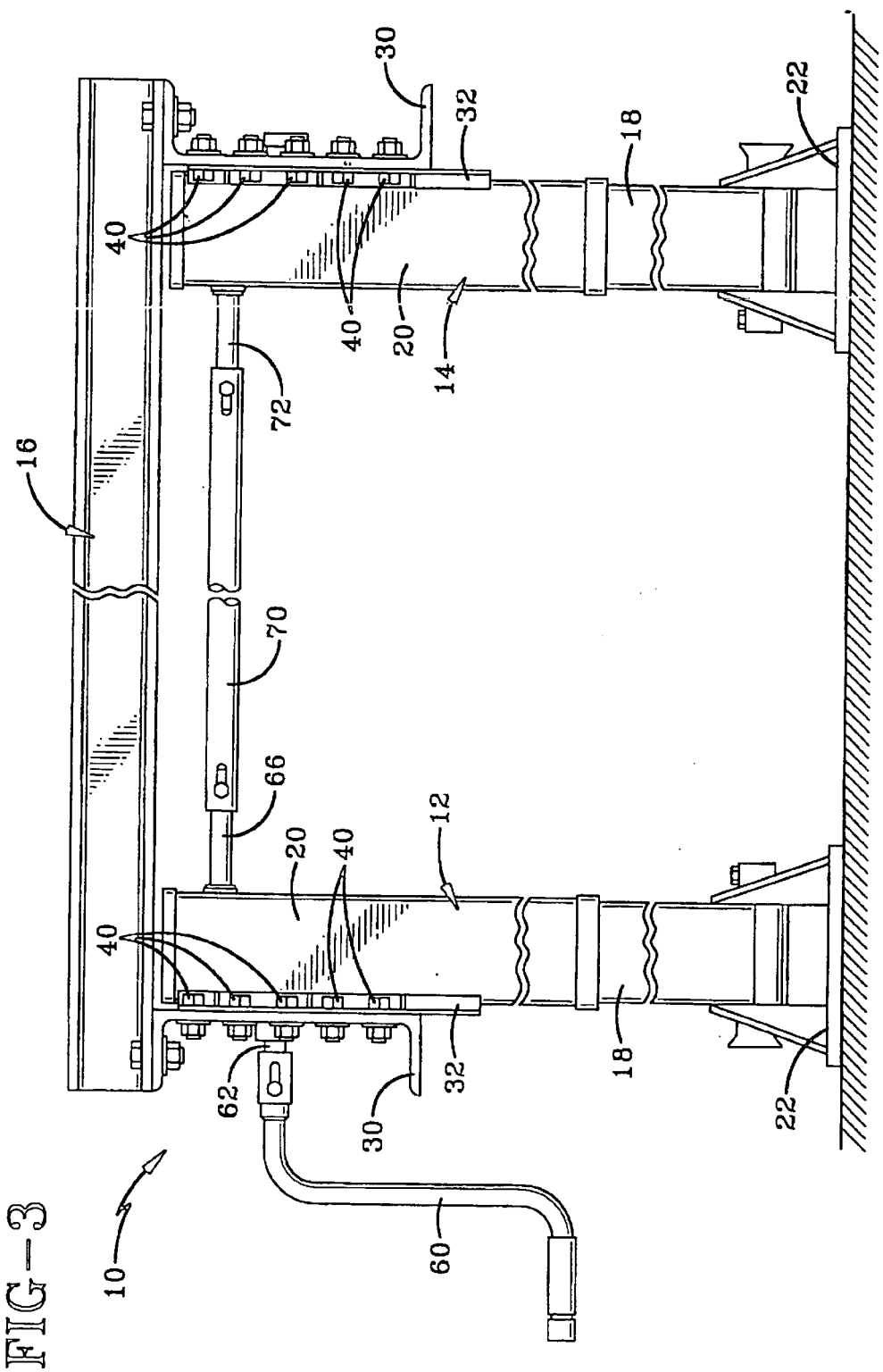

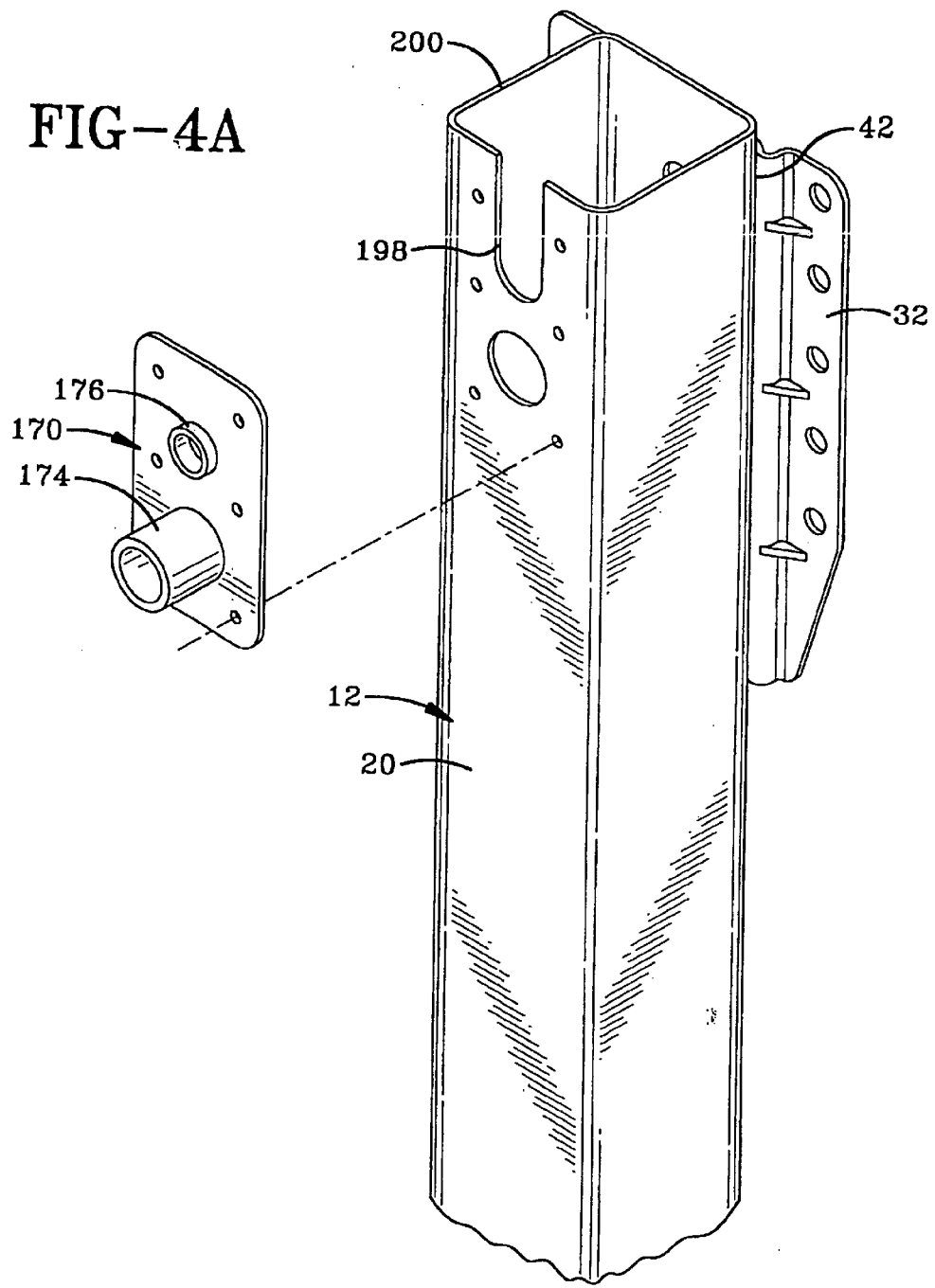

TRAILER LANDING GEAR

CROSS REFERENCE TO RELATED APPLICATIONS

This application is a division of U.S. application Ser. No. 09/491,425 filed Jan. 26, 2000, now abandoned; the disclosures of which are incorporated herein by reference.

BACKGROUND OF THE INVENTION

1. Technical Field

This invention generally relates to semitrailer landing gear and, more particularly, to a landing gear assembly that can be mounted in an inboard or outboard configuration. Specifically, the present invention relates to a single reduction landing gear assembly including a housing having an outer perimeter that fits within the standard mounting bracket for a tractor trailer thus enabling an inboard or outboard mounting configuration. The landing gear also has an improved gear assembly.

2. Background Information

Tractor trailers are a predominant means of transporting goods throughout the world. Trailers are popular because goods do not have to be loaded and reloaded as trailers can deliver directly to the cargo bay of the destination. Trailers also can be detached from a tractor and pulled by another tractor allowing goods to be transported in a trailer without driver downtime. A driver thus can drop off a loaded trailer for unloading and pick up a loaded trailer that is ready to ship.

Trailer landing gear supports the front of a trailer when the trailer is detached from a tractor. Trailer landing gear typically includes a pair of laterally-spaced, gear-driven telescopic legs mounted on the front end of the semitrailer. The gear boxes of each leg are linked by a shaft allowing a single crank to be used to raise or lower both legs simultaneously.

The following description of the use of two-speed landing gear is provided as general background information. A typical scenario begins with the operator of a truck tractor dropping off the semitrailer at a location such as a dock for loading or unloading of the semitrailer. This semitrailer is retrieved when loading or unloading is completed, often by another tractor. When disconnecting after positioning the semitrailer in the desired location, the truck operator manually turns a crank handle to extend the legs of the landing gear until the legs engage the ground. The operator typically uses the high gear or high speed of the two-speed gear assembly to quickly extend the landing gear legs from the retracted position to the extended position where the legs contact the ground. It should be noted that when the landing gear assembly is engaged in high gear, quick traversal of a vertical distance is accomplished due to the low ratio of crank handle turns to inches of vertical leg travel distance afforded by the high gear, which ratio usually is from about 2 to about 5 depending on the unit being utilized. The tradeoff for such a low ratio achieved in high gear is a lower mechanical advantage than the mechanical advantage that can be achieved in a lower gear. In practical terms, this means that the truck operator cannot raise or lower a load in high gear. In low gear the ratio of crank handle turns to distance traveled is higher, usually from about 15 to about 50, but a higher mechanical advantage is enjoyed. The high mechanical advantage enables the truck operator to raise or lower loads in low gear that could not be moved in high gear, albeit at a slower pace than if such loads could be moved in high gear. In order to pull the truck tractor away from the stationary semitrailer, the operator must disengage the depending kingpin of the semitrailer from the fifth wheel of the truck tractor by disengaging the fifth wheel jaws. Since the tractor is spring-biased in an upward direction, it is desirable to raise the semitrailer to relieve some of the load allowing the tractor to pull away from the semitrailer more easily. The operator may therefore shift the gear assembly to low gear in order to further extend the landing gear legs and raise all or part of the load of the semitrailer from the fifth wheel. After releasing the movable jaws of the fifth wheel, the tractor is disengaged from the semitrailer.

When an operator picks up a semitrailer that has been loaded or unloaded, he must back the truck tractor fifth wheel under the semitrailer and engage the kingpin. If the semitrailer was resting on a stable surface such as concrete, and a similar tractor is utilized, the necessary clearance to allow coupling most likely still exists between the ground and the kingpin, and the operator merely will back the truck tractor under the semitrailer engaging the kingpin. The operator will shift the landing gear into low gear to lower the load onto the tractor, then shift into high gear and quickly retract the legs to provide clearance for vehicle operation. More particularly, the legs are positioned approximately one foot off of the ground to provide clearance for over-the-road travel. However, if the semitrailer was left on a relatively unstable surface such as soft ground or blacktop, the semitrailer legs sometimes sink into the ground under the load of the trailer between the drop off and pickup times. If this is the case, or if a higher tractor is employed, the operator must further extend the legs to raise the trailer to provide sufficient clearance between the ground and the kingpin. This requires the operator to shift the landing gear into low gear to gain mechanical advantage to raise the trailer. After coupling to the tractor and lowering the trailer load onto the tractor using low gear, the operator then will proceed as descried above to retract the legs in high gear to position the legs for over-the-road travel. This process is common to essentially all types of landing gears.

Landing gear legs are mounted in both inboard and outboard configurations. The choice of mounting arrangement depends on the type of trailer, the type of landing gear, and the manufacturer. One of the problems with existing semitrailer landing gear is that the gear box or gear housing located at the top of the telescoping legs prevents one side of the landing gear from being mounted on the trailer frame. The protruding gear box thus provides only one available mounting surface on the landing gear. Such landing gear can only be mounted on one side of the frame member of the trailer thus requiring the landing gear manufacturer to provide both inboard and outboard configurations. Trailer manufacturers thus desire a landing gear that may be mounted in the inboard or outboard configuration.

Another problem with existing gear box assemblies is that the shaft location of the gear box assemblies does not allow the landing gears to be switched between inboard and outboard mounting. Landing gears are mounted with a standard hole pattern having a pentagon-shaped central opening surrounded by a plurality of bolt holes. Existing outboard landing gears are designed to position the inner connecting shaft within the central opening. Inboard landing gear positions the input crank shaft within this opening so that the crank can be easily accessed by the user at the outside of the trailer. The art desires a landing gear assembly that locates the crank shaft in a manner that allows the crank shaft side of the landing gear to be mounted on the inboard side of the trailer frame.

Another problem in the art is that the gear assembly used to raise and lower the legs of the landing gear must be able to be easily assembled. Assembling the gear assembly inside the legs of the landing gear can be especially difficult given the limited volume within which to work. The art thus desires any gear assembly for a landing gear to be able to be assembled without extraordinary efforts. The art also desires that the gear assembly does not take away from the strength of the legs of the landing gear. It is desired to provide a gear assembly that strengthens the landing gear.

SUMMARY OF THE INVENTION

In view of the foregoing, it is an objective of the present invention to provide a landing gear assembly that may be mounted in either an inboard or outboard configuration.

Another objective of the present invention is to provide a landing gear assembly that may be mounted on either an inboard or outboard mounting configuration with the standard hole pattern used to mount existing landing gear.

Another objective of the present invention is to provide a landing gear that may be mounted in an inboard or outboard mounting configuration while using the standard mounting bracket used to mount existing landing gear.

Another objective of the present invention is to provide a landing gear having an internal gear assembly that may be easily assembled within the interior of one leg of the landing gear.

Another objective of the present invention is to provide a landing gear assembly having a cover that holds the ends of the gear shafts when the landing gear is assembled.

Another objective of the present invention is to provide a landing gear assembly wherein one wall of a leg of the landing gear assembly includes an elongated slot that allows the gear assembly to be easily assembled inside the leg.

Another objective of the present invention is to provide a landing gear assembly having a gear assembly that receives the inner end of the input shaft and other gear members directly to the upper tube of the leg.

Another objective of the present invention is to provide a landing gear assembly having a compact gear assembly that is stronger than prior art assemblies.

Another objective of the present invention is to provide a landing gear assembly having a tube and nut configuration that strengthens the landing gear when the landing gear is in an extended position.

A further objective of the present invention is to provide a landing gear that is of simple construction, that achieves the stated objectives in a simple, effective, and inexpensive manner, that solves the problems and that satisfies the needs existing in the art.

These and other objectives and advantages are obtained by the improved landing gear of the present invention, the general nature of which may be stated as the combination of a leg for a landing gear assembly for a semitrailer; a mounting bracket; and a mounting surface on a semitrailer; the mounting surface of the semitrailer having a main mounting hole; the leg having a lower tube being telescopically received in an upper tube, the upper tube having a perimeter; the mounting bracket having a pair of substantially coplanar flanges and a seat; the seat being offset from the flanges by a space; the seat of the mounting flange being connected to the upper tube; and a gear assembly disposed entirely within the perimeter of the upper tube, the space between the seat and the flanges, and the main hole of the mounting surface so that the leg may be mounted in an inboard or outboard configuration.

Other objectives and advantages of the invention are achieved by a leg for a semitrailer landing gear, the leg including an upper tube and a lower tube, the lower tube being telescopically received in the upper tube; an input shaft; a gear assembly disposed in the upper tube, the gear assembly connected to the input shaft; the gear assembly capable of raising and lowering the lower tube with respect to the upper tube in response to rotation of the input shaft; a floor base connected to the upper tube; the floor base having a bore; and at least a portion of the input shaft being received in the bore.

Still other objectives and advantages of the invention are achieved by a leg for a semitrailer landing gear, the leg including an upper tube and a lower tube, the lower tube being telescopically received in the upper tube; an input shaft; a gear assembly disposed in the upper tube, the gear assembly connected to the input shaft; the gear assembly capable of raising and lowering the lower tube with respect to the upper tube in response to rotation of the input shaft; and a cover connected to the upper tube, the cover supporting at least a portion of the input shaft.

Further objectives and advantages of the invention are achieved by a leg for a semitrailer landing gear, the leg including an upper tube and a lower tube, the lower tube being telescopically received in the upper tube; an input shaft; an output shaft; a gear assembly disposed in the upper tube, the gear assembly connected to the input shaft and the output shaft; the gear assembly capable of raising and lowering the lower tube-with respect to the upper tube in response to rotation of the input shaft; and a cover connected to the upper tube, the cover supporting at least a portion of the output shaft.

BRIEF DESCRIPTION OF THE DRAWINGS

The preferred embodiments of the invention, illustrative of the best mode in which applicant contemplated applying the principles of the invention, are set forth in the following description and are shown in the drawings and are particularly and distinctly pointed out and set forth in the appended Claims.

FIG. 2 is an end view of a landing gear assembly mounted in an outboard configuration;

FIG. 3 is an end view of a landing gear assembly mounted in an inboard configuration;

FIG. 4A is a perspective view of an alternative embodiment of the upper leg position;

Similar numbers refer to similar parts throughout the specification.

DESCRIPTION OF THE PREFERRED EMBODIMENT

Figure 1:
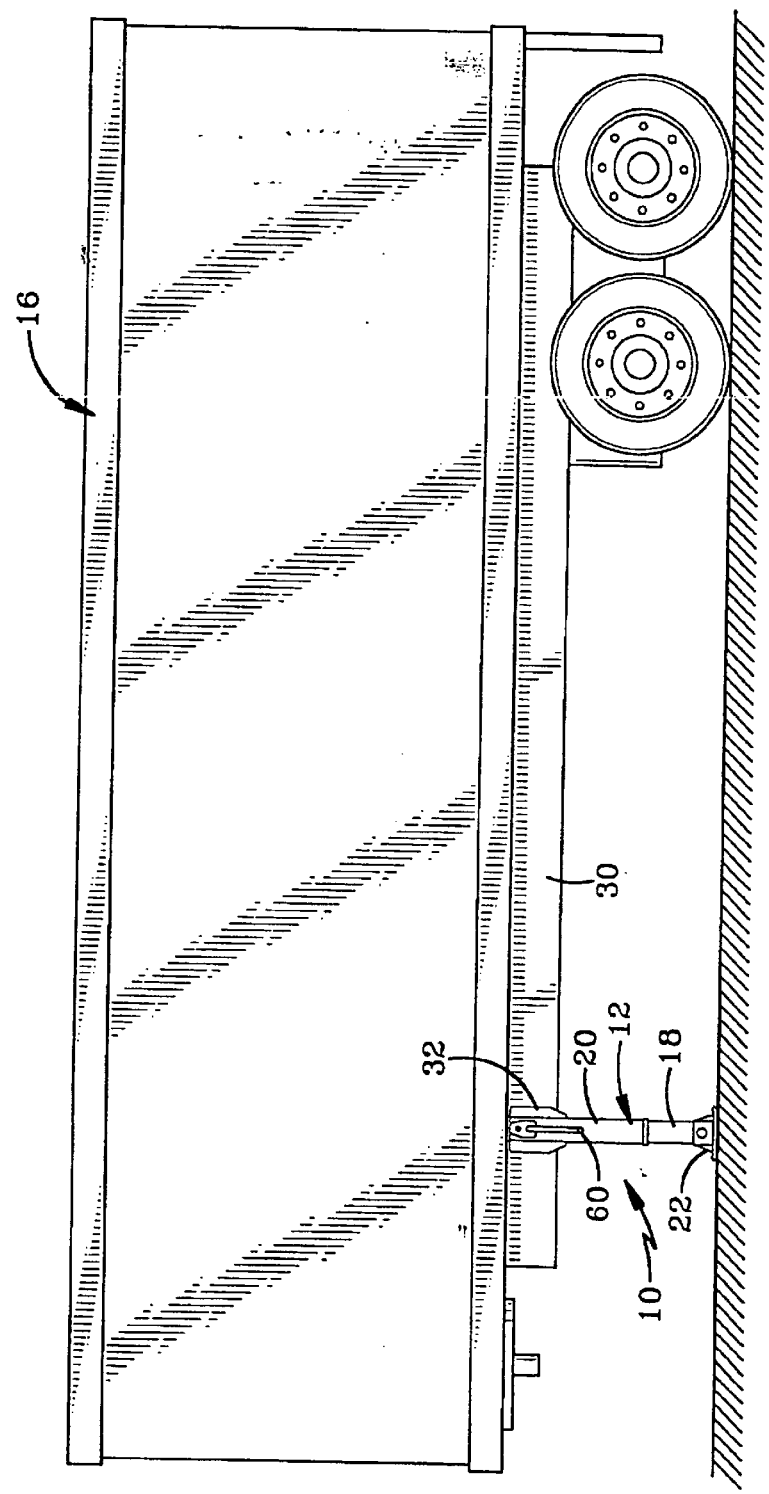
FIG. 1 is a side elevational view of a semitrailer with the landing gear of the present invention mounted in an outboard configuration.

The landing gear of the present invention is indicated generally by the numeral 10 in the accompanying drawings. Landing gear 10 generally includes a pair of vertically extendable and retractable supports in the form of upright, spaced, parallel and opposite side legs 12 and 14 that are connected to the front end of a semitrailer 16. In the embodiment shown in the drawings, cranking leg 12 is disposed on the left or driver's side of semitrailer 16. Cranking leg 12 may also be disposed on the right side of semitrailer 16 if desired.

Each leg 12 and 14 includes a lower tube 18 telescopically disposed within an upper tube 20. A foot 22 is connected to the lower end of each lower tube 18 in a conventional manner.

Figure 2A:
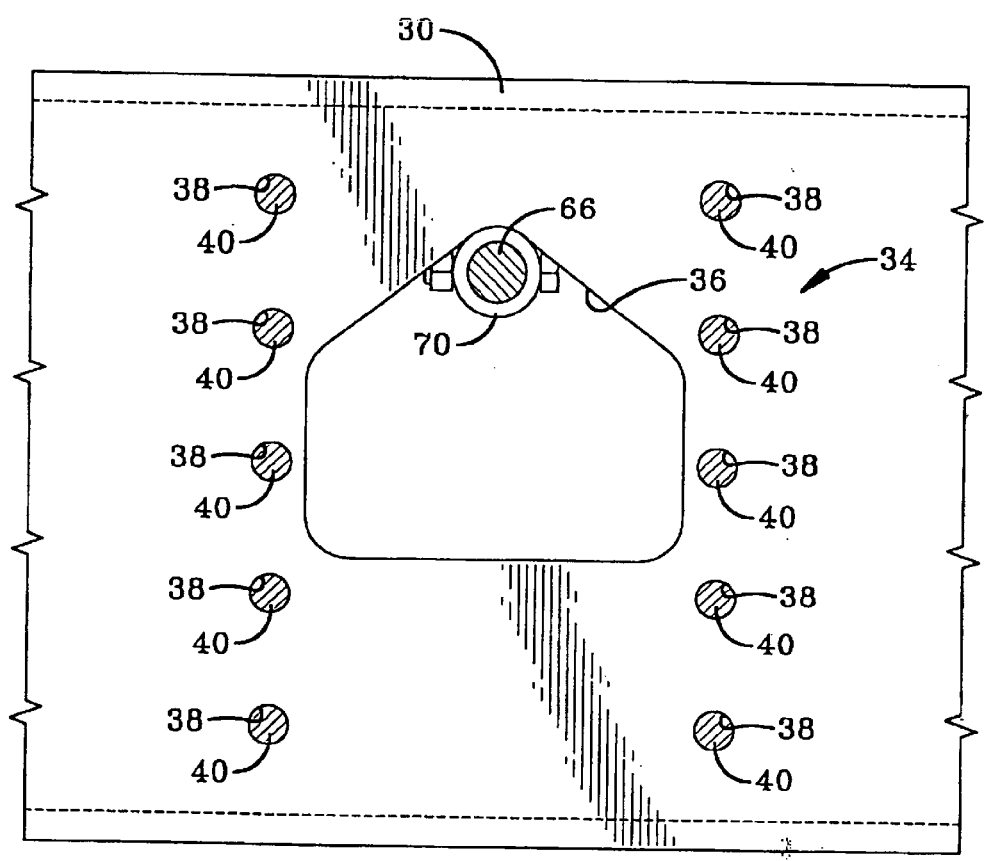
FIG. 2A is a front view of the mounting hole in a channel as viewed along line 2A—2A in FIG. 2.
Figure 8:
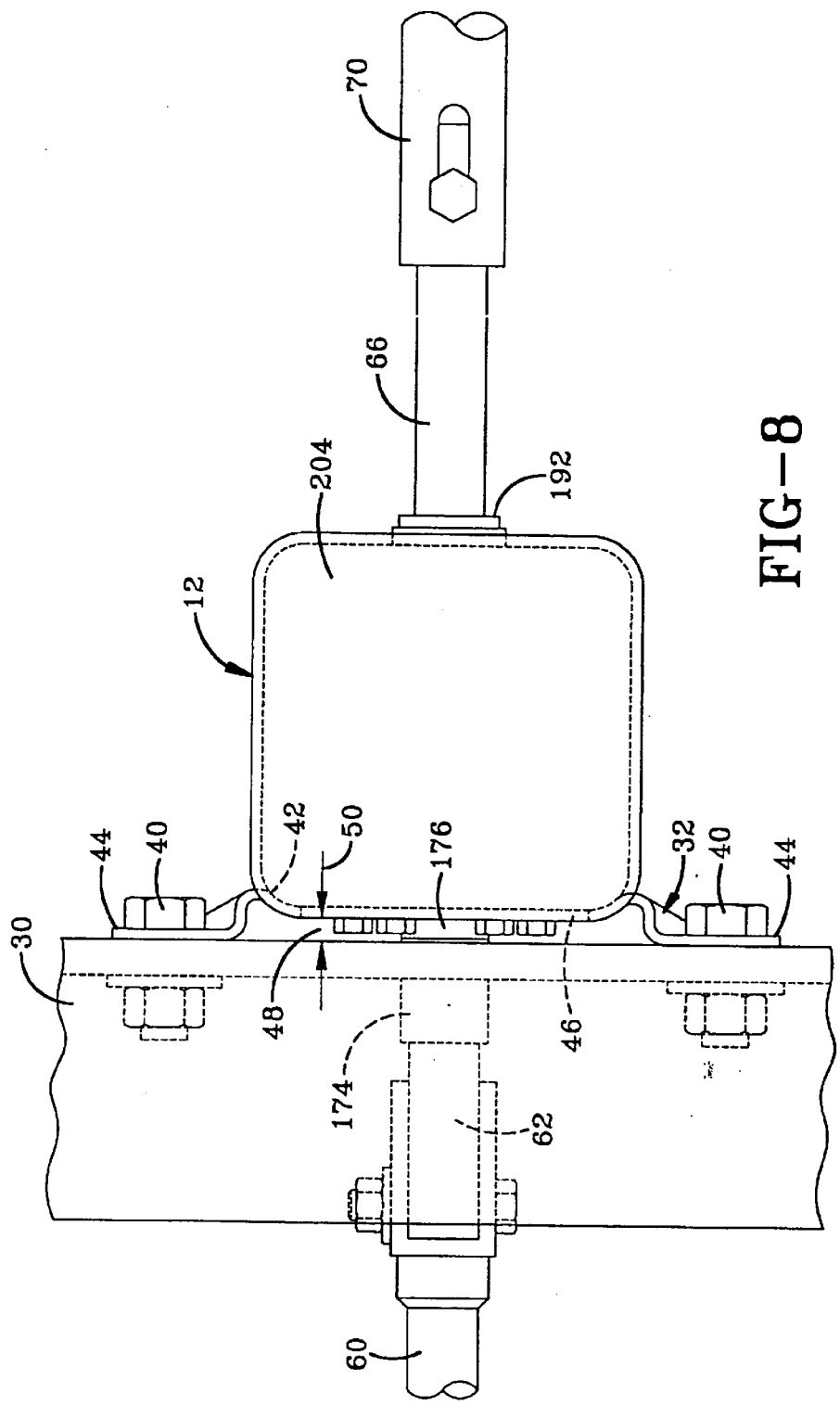
FIG. 8 is a top view of the drive leg of a landing gear assembly in an outboard configuration.
Figure 9:
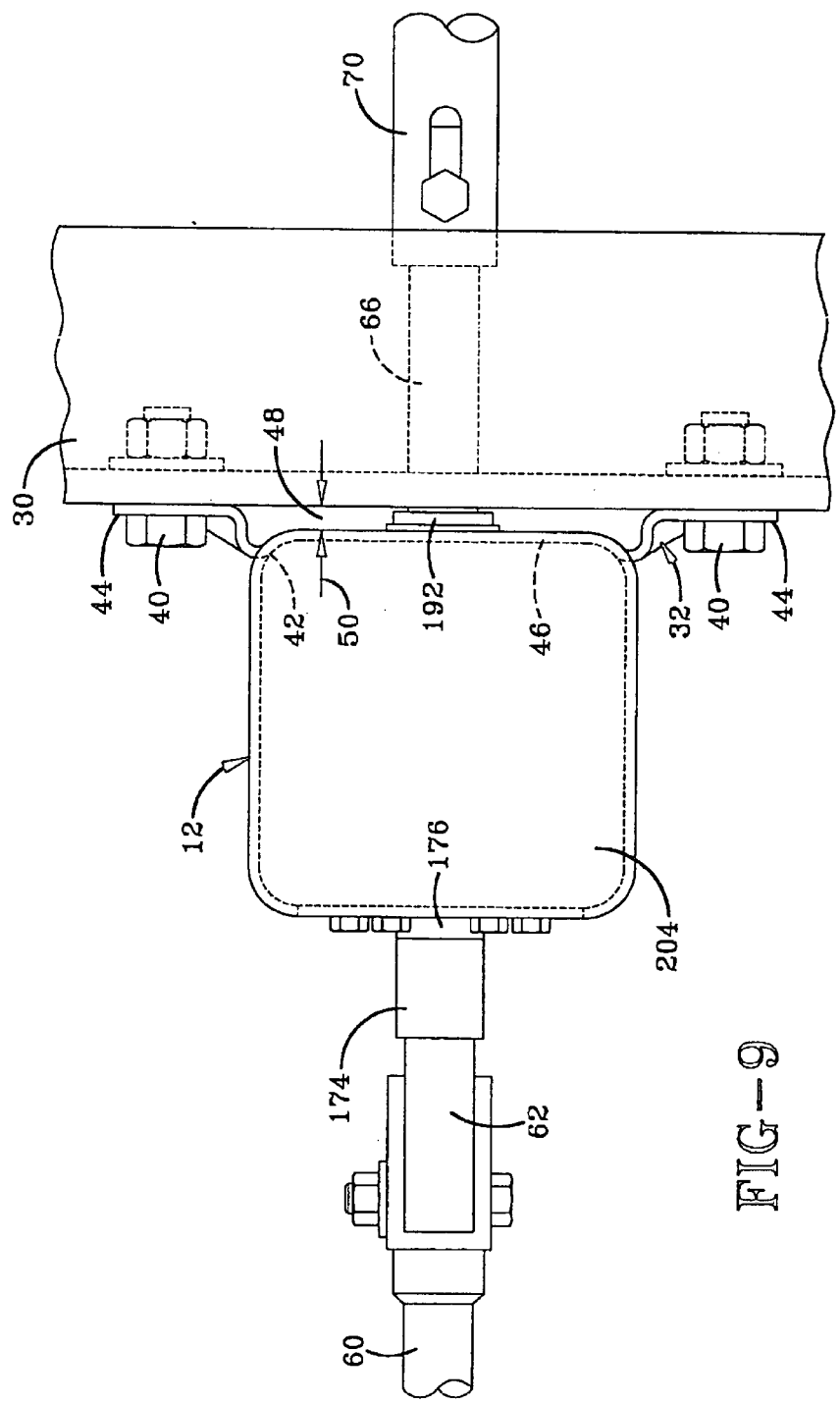
FIG. 9 is a top view of the drive leg of the landing gear assembly in an inboard configuration.

Semitrailer 16 includes a pair of spaced apart, longitudinally disposed channels 30. Landing gear 10 is mounted to channels 30 in either an inboard configuration as depicted in FIGS. 3 and 8 or an outboard configuration as depicted in FIGS. 1, 2, and 9. In accordance with one of the objectives of the present invention, landing gear 10 and each leg 12 and 14 of landing gear 10 is configured to be mountable in either the inboard or outboard configurations with a standard mounting bracket 32 used with the standard mounting hole configuration depicted in FIG. 2A. Standard mounting hole configuration 34 includes a centrally disposed main hole 36 and a set of bolt holes 38 disposed on either side of main hole 36. Each set of bolt holes 38 includes five vertically aligned, evenly spaced holes. In accordance with one of the objectives of the present invention, landing gear 10 may be mounted to any semitrailer 16 having mounting hole configuration 34. In the embodiment of the invention depicted in the drawings, mounting hole configuration 34 is formed directly in channels 30. In other embodiments, mounting holes 34 may be formed in support flanges or other structural members extending from or connected to semitrailer 16.

Mounting brackets 32 are connected to semitrailer 10 with a plurality of bolts 40. Upper tubes 20 of landing gear 10 are connected to mounting brackets 32 by welds 42. As may be perhaps best seen in FIGS. 8 and 9, mounting bracket 32 includes two substantially coplanar flanges 44 and a seat 46 that receives upper tube 20. Seat 46 is spaced from flanges 44 to create a space 48 as indicated by the dimension line 50. Space 48 is typically three-eighths of an inch but may be other dimensions without departing from the concepts of the present invention. Space 48 accommodates protrusions from upper tube 20 that would otherwise engage channel 30 and prevent upper tube 20 from being securely mounted to channel 30. In accordance with one of the objectives of the present invention, landing gear 10 uses space 48 and main hole configuration 36 of mounting hole 34 to accommodate various elements of landing gear 10 so that landing gear 10 may be mounted in either the inboard or outboard configuration. Landing gear 10 thus achieves one of the objectives of the present invention by having no elements that extend beyond space 48 except those elements that extend through main hole 36 of mounting hole 34. This configuration allows either side of upper tube 20 to be mounted with mounting bracket 32 to channel 30.

Landing gear 10 further includes an input crank handle 60 attached to an input shaft 62. Input shaft 62 transfers force from crank handle 60 into a gear assembly 64 that, in turn, transfers the force to an output shaft 66 and a vertical elevating shaft 68. Vertical elevating shaft 68 is used to move lower tube 18 as will be described in more detail below. Output shaft 66 transfers the force to a connecting shaft 70 that transfers the force across semitrailer 16 to leg 14 of landing gear 10. Connecting shaft 70 is connected to shaft 72 of leg 14. This interconnection of elements allows the user of landing gear 10 to simultaneously raise or lower legs 12 and 14 by turning crank 60.

Figure 5:
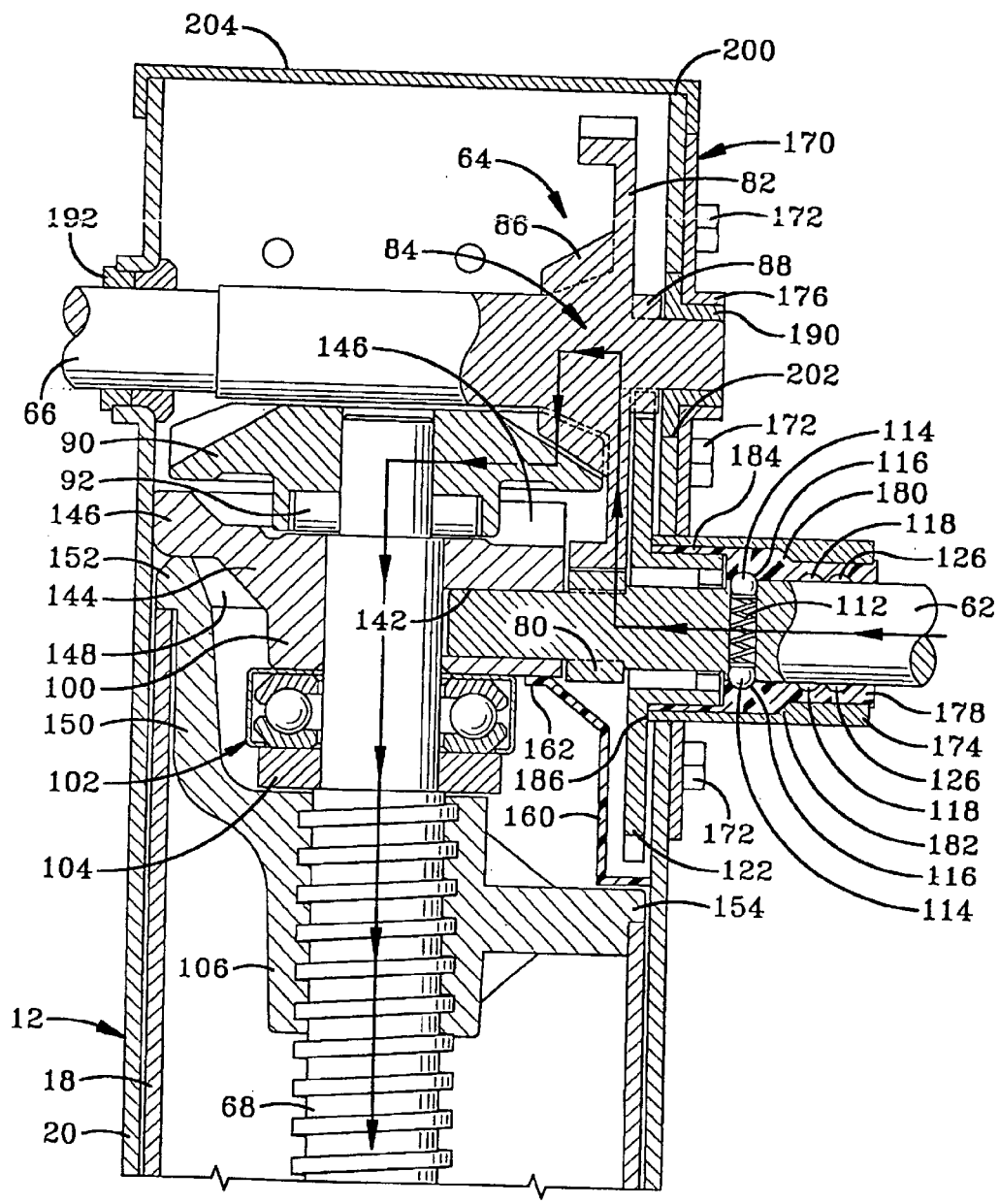
FIG. 5 is a sectional view of the landing gear in the low gear setting.
Figure 6:
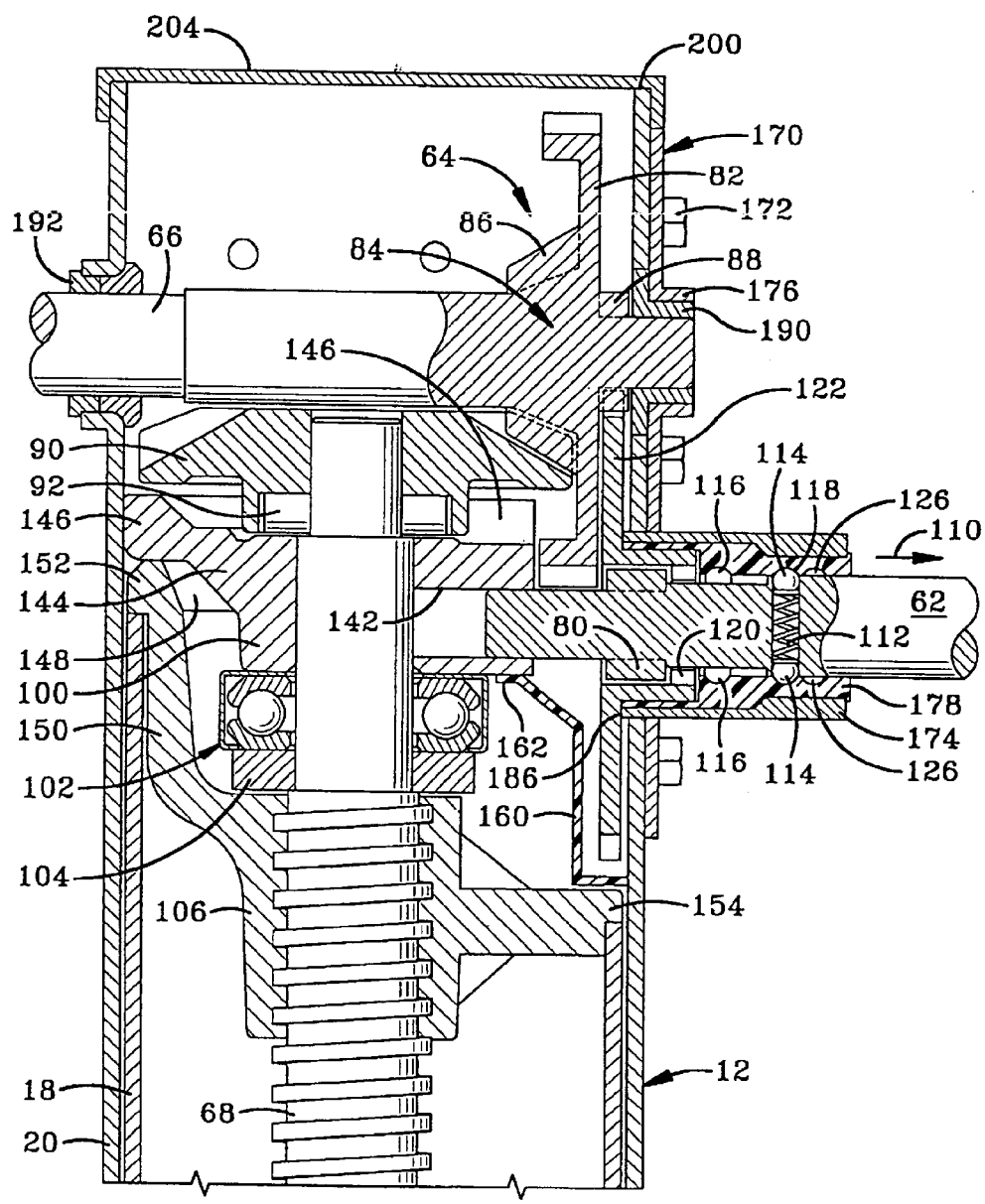
FIG. 6 is a sectional view of the landing gear in the neutral gear setting.
Figure 7:
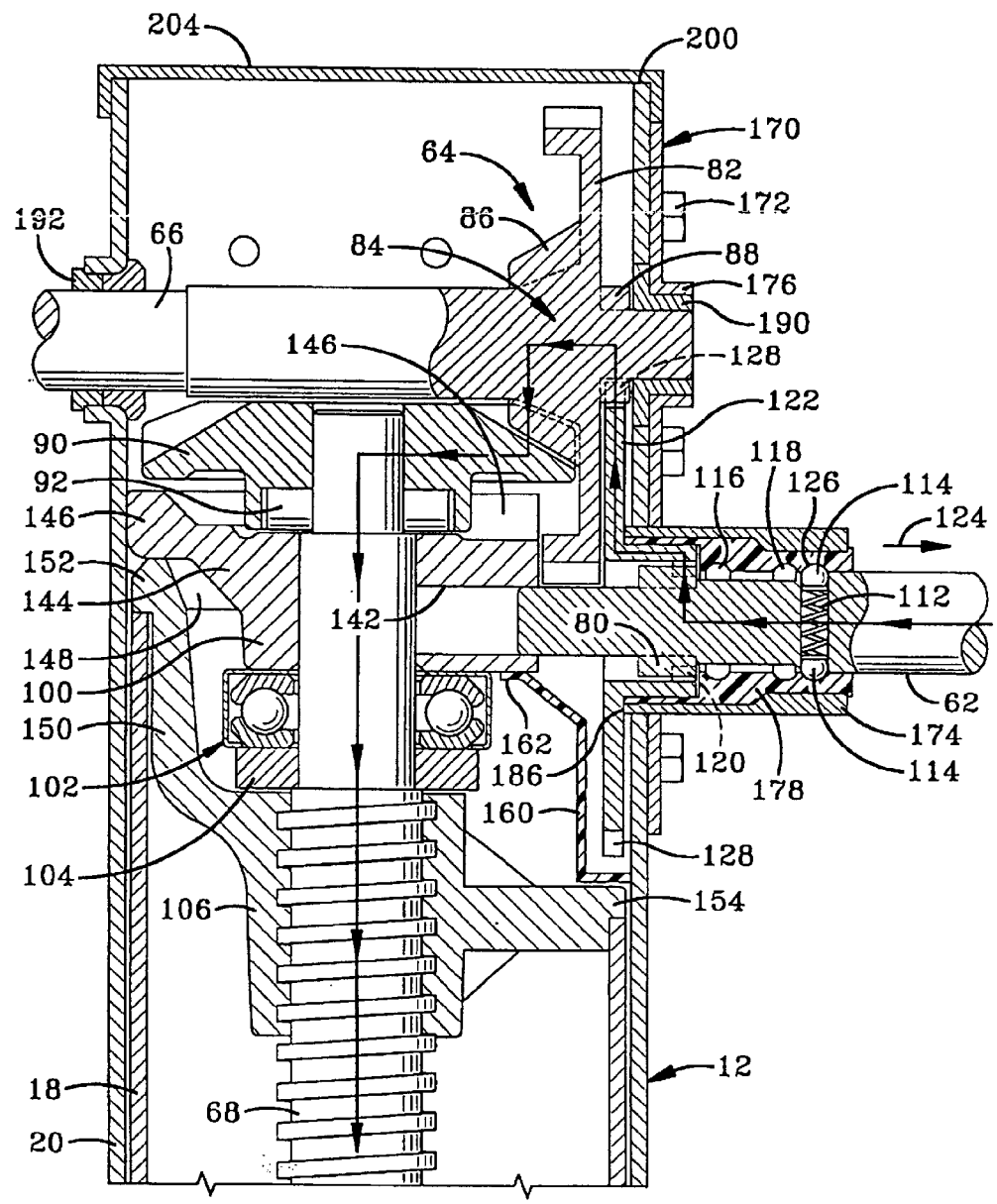
FIG. 7 is a sectional view of the landing gear in the high gear setting.

Gear assembly 64 is depicted in FIGS. 5, 6, and 7 in the low gear, neutral gear, and high gear position respectively. In the low gear position depicted in FIG. 5, input shaft 62 directly drives a pinion gear 80 against an intermediate gear 82. Pinion gear 80 has substantially fewer teeth than intermediate gear 82 and pinion gear 80 has a substantially smaller diameter than intermediate gear 82. As such, multiple turns of pinion gear 80 are required to turn intermediate gear 82 a single rotation. In the preferred embodiment of the present invention, pinion gear 80 includes an X teeth with intermediate gear 82 including X teeth. Intermediate gear 82 is part of a combination gear 84 that includes intermediate gear 82, a bevel pinion gear 86 and a second pinion gear 88. Intermediate gear 82, bevel pinion gear 86, and second pinion ger 88 may be preferably fabricated as an integral element with output shaft 66 or may be fabricated as an integral element that is later connected to output shaft 66. In other embodiments, gears 82, 86, and 88 may be separately fabricated and later connected to output shaft 66.

Bevel pinion gear 86 rotates with intermediate gear 82 and engages bevel gear 90 causing vertical elevating shaft 68 to rotate. Bevel gear 90 may be connected to vertical elevating shaft 68 by any of a variety of known methods. A pin 92 preferably connects bevel gear 90 to shaft 68. Shaft 68 passes through a floor base 100, a bearing block 102, and an annular collar 104. Annular collar 104 rests on a shoulder formed on shaft 68. Shaft 68 then threadably engages a nut 106 that abuts the upper end of lower leg tube 18. Rotation of shaft 68 causes nut 106 to move up and down with respect to shaft 68 thus causing lower leg 18 to move up and down with respect to upper tube 20.

A neutral position is depicted in FIG. 6. In this position, pinion gear 80 is moved out of engagement with intermediate gear 82 by moving input shaft 62 in the direction of arrow 110. A detent spring 112 forces detent balls 114 into detents 116 in the low gear position. The force pulling input shaft 62 in direction 110 compresses spring 112 allowing balls 114 to move out of detents 116. Shaft 62 moves smoothly outwardly until spring 112 snaps balls 114 into detents 118. Detents 118 are positioned to cause pinion gear 80 to be freely disposed between intermediate gear 82 and the inwardly facing teeth 120 of a transfer gear 122. In this position, input shaft 62 may rotate freely without causing gears 82 or 122 to rotate.

The high gear position is achieved by moving shaft 62 farther outwardly as indicated by arrow 124 in FIG. 7. This motion compresses spring 112 allowing balls 114 to move from detent 118 into detent 126 for the high gear position. Detents 126 are positioned to cause pinion gear 80 to engage teeth 120 of transfer gear 122. Transfer gear 122 includes outwardly facing teeth 128 that engage second pinion gear 88. In this position, rotation of shaft 62 causes pinion gear 80 to drive transfer gear 122. Rotation of transfer gear 122 drives second pinion gear 88 of combination gear 84. Rotation of combination gear 84 causes bevel pinion gear 86 to drive bevel gear 90. Transfer gear 122 rotates at the same rate as input shaft 62 and has substantially more teeth and a substantially larger diameter than second pinion gear 88. A single rotation of shaft 62 thus creates multiple rotations in second pinion gear 88. In the preferred embodiment, transfer gear 122 includes X outwardly facing teeth 128 while second pinion gear 88 includes X teeth.

In accordance with one of the objectives of the present invention, gear assembly 64 is housed substantially within the perimeter of upper tube 20 with only limited elements extending outside the perimeter of upper tube 20. These elements, depicted on the right hand side of upper tube 20 in FIGS. 5–7, do not extend beyond space 48 except for those elements that extend into main hole 36 of mounting hole configuration 34. This configuration allows landing gear 10 to be mounted in an inboard configuration or an outboard configuration.

The inner end 140 of input shaft 62 is rotatingly and slidably supported by floor base 100. Floor base 100 includes a bore 142 on the input side of floor base 100 to receive inner end 140. Inner end 140 is slidably received in bore 142 to allow shaft 62 to be moved between the low gear, neutral, and high gear positions. Floor base 100 includes an upwardly and outwardly extending arm 144 that is connected to the inner surface of upper tube 20 at its outer end 146. Outer end 146 is preferably welded to the inner surface of upper tube 20. In accordance with one of the objectives of the present invention, arm 144 extends upwardly from the longitudinal axis of input shaft 62 such that the connection of floor base 100 to upward tube 20 is substantially above input shaft 62. The configuration of arm 144 of floor base 100 leaves a space 148 where an arm 150 of nut 106 may extend up above the longitudinal axis of input shaft 62. The upper end 152 of arm 150 rests on top of the upper end of lower tube 18. In accordance with one of the objectives of the present invention, the connection between upper end 152 and lower tube 18 on the output side of leg 12 is higher than the connection between lower end 154 of nut 106 and lower tube 18 on the input side. The intermediate portion of nut 106 is disposed at substantially the same height as the output side. In the preferred embodiment, the upper connection is disposed slightly higher than the longitudinal axis of input shaft 62. This nut configuration increases the strength of leg 12 in the extended, position because it allows more of upper tube 20 to overlap with lower tube 18. The increased overlap helps prevent leg 12 from buckling.

In accordance with another objective of the present invention, upper end 152 of nut 106 directly contacts floor base 100 when nut 106 is at the top of the threaded portion of shaft 68 (when lower tube 18 is in the fully retracted position). This connection allows force to be transferred directly from lower-tube 18 through nut 106 and floor base 100 to upper tube 20.

In accordance with another of the objectives of the present invention, a shield 160 is connected to floor base 100 on the input side of leg 12 to prevent the grease packed around gear assembly 64 from falling down onto nut 106. Shield 160 extends around transfer gear 122, under the low gear position of pinion gear 80, and snap fits (or is otherwise connected to) the input side of floor base 100 around the connection of shaft 62 with floor base 100. In one embodiment of the invention, shield 160 includes a substantially U-shaped inner end that snaps around the outside of floor base 100. The lowermost portion 162 of the U-shaped end may be seen in FIGS. 5–7. Shield 160 may be preferably fabricated from a plastic but other materials will function without departing from the concepts of the present invention.

In accordance with another objective of the present invention, a cover 170 is connected to the input side of upper tube 20. Cover 170 supports shafts 62 and 66 with respect to the input side of upper tube 20 and allows landing gear leg 12 to be easily assembled. Cover 170 is connected to the outer surface of upper tube 20 by a plurality of screws 172. It is preferred that no portion of screws 172 extends into the inside of upper tube 20 so as not to interfere with the gears of gear assembly 64. In other embodiments of the invention, cover 170 may be welded, riveted, snap-fit, press-fit, or connected by any of a variety of other connection methods to upper tube 20. Cover 170 includes a first sleeve 174 that receives input shaft 62 and a second sleeve 176 that receives output shaft 66. More specifically, a first bushing 178 is disposed between first sleeve 174 and input shaft 62. Bushing 178 includes detents 116, 118, and 126. First bushing 178 further includes an outwardly facing shoulder 180 that engages an inwardly facing shoulder 182 formed on the inside surface of first sleeve 174. Shoulders 180 and 182 prevent bushing 178 from being pulled from sleeve 174 when shaft 62 is moved between the different gear positions. The inner end 184 of bushing 178 is disposed between sleeve 174 and transfer gear 122. The inner end 186 of sleeve 174 or the inner end of bushing 178 abuts transfer gear 122 and prevents transfer gear 122 from engaging the inner surface of upper tube 20. Sleeve 174 may be integrally fabricated with cover 170 or may be fabricated separately and connected to cover 170 at a later time.

A second bushing 190 is disposed between second sleeve 176 and output shaft 66. Bushing 190 rotatably supports shaft 66 and properly positions second pinion gear 88 with respect to transfer gear 122. A third bushing 192 supports the output side of output shaft 66 with respect to upper tube 20.

In accordance with one of the objectives of the present invention, second sleeve 176 is entirely disposed within space 48 as depicted in FIG. 8 when the input side of leg 12 is used as the mounting side. In this position, first sleeve 174 is disposed within main hole 36 of mounting hole 34. Shaft 62 and 66 are spaced vertically at such a distance so that each may be fit within main hole 36 when leg 12 is mounted in either the inboard or outboard configuration. Thus, in FIG. 9, output shaft 64 passes through main hole 36 and cover 170 faces away from channel 30.

Figure 4:
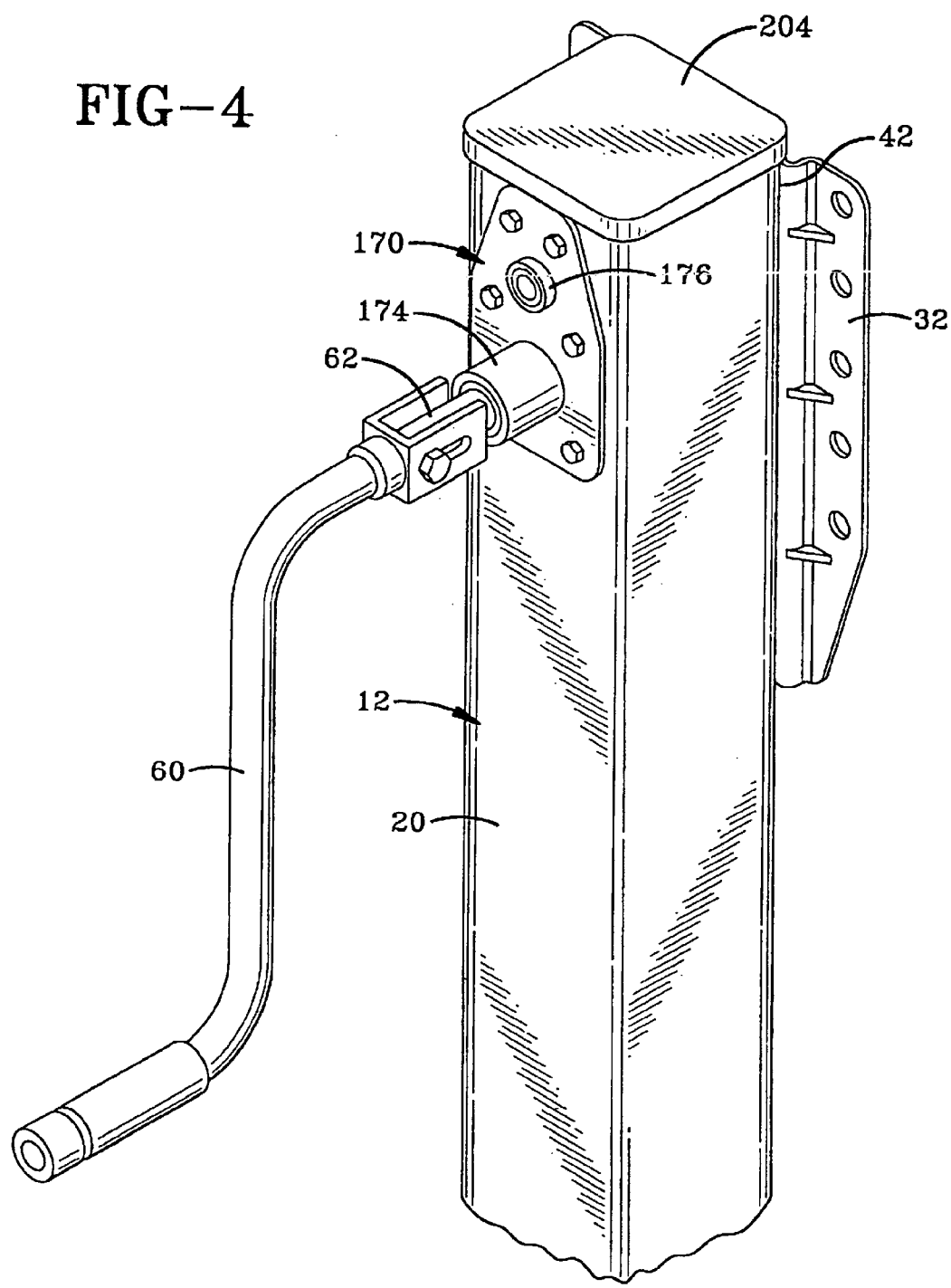
FIG. 4 is a perspective view of a single leg of a landing gear assembly made in accordance with the concepts of the present invention.

In order to ease the process of assembling gear assembly 64 within leg 12, the upper end of upper tube 20 may be optionally provided with a slot 198 (FIG. 4A) that extends from the upper edge 200 down to the lower edge of the hole that receives bushing 190. Slot 198 allows input shaft 66 and combination gear 84 to be first slid through the hole in upper tube 20 that receives bushing 192 and then pivoted down into upper tube 20 with the input side of output shaft 66 passing through slot 198. When slot 198 is used, cover 170 is used to close slot 198 and maintain the structural integrity of the top of upper tube 20.

A cap 204 is used to close the upper end of upper tube 20. Cap 204 may be fabricated separate or integrally with cover 170.

Accordingly, the improved trailer landing gear apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the trailer landing gear is constructed and used, the characteristics of the construction, and the advantageous new and useful results obtained; the new and useful structures, devices, elements, arrangements, parts, and combinations are set forth in the appended claims.

What is claimed is:

1. In combination:
   a leg for a landing gear assembly for a semitrailer; a mounting bracket; and a mounting surface on a semitrailer;
   the mounting surface of the semitrailer having a main mounting hole;
   the leg having a lower tube being telescopically received in an upper tube, the upper tube having a perimeter;
   the mounting bracket having a pair of substantially coplanar flanges and a seat; the seat being offset from the flanges by a space;
   the seat of the mounting flange being connected to the upper tube; and
   a gear assembly disposed entirely within the perimeter of the upper tube, the space between the seat and the flanges, and the main hole of the mounting surface so that the leg may be mounted in an inboard or outboard configuration;
   an input shaft and a floor base; the floor base being connected to the upper tube; and at least a portion of the input shaft being supported by the floor base;
   a nut connecting the gear assembly to the lower tube; and
   the nut and the lower tube being connected at a location above the connection between the input shaft and the floor base.

2. The combination of claim 1, further comprising a cover connected to the upper tube; the cover positioning at least a portion of the gear assembly.

3. The combination of claim 2, wherein the cover includes a first sleeve; a portion of the input shaft being supported by the first sleeve.

4. The combination of claim 3, further comprising a first bushing disposed between the input shaft and the first sleeve.

5. In combination:
   a leg for a landing gear assembly for a semitrailer; a mounting bracket; and a mounting surface on a semitrailer;
   the mounting surface of the semitrailer having a main mounting hole;
   the leg having a lower tube being telescopically received in an upper tube, the upper tube having a perimeter;
   the mounting bracket having a pair of substantially coplanar flanges and a seat; the seat being offset from the flanges by a space;
   the seat of the mounting flange being connected to the upper tube;
   a gear assembly disposed entirely within the perimeter of the upper tube, the space between the seat and the flanges, and the main hole of the mounting surface so that the leg may be mounted in an inboard or outboard configuration;
   a cover connected to the upper tube; the cover positioning at least a portion of the gear assembly;
   the cover including a first sleeve; a portion of the input shaft being supported by the first sleeve;
   a first bushing disposed between the input shaft and the first sleeve; and
   the first sleeve engaging the gear assembly to position a portion of the gear assembly in a position spaced from the inner surface of the upper tube.

6. The combination of claim 5, wherein the gear assembly includes a combination gear and a bevel gear; the combination gear being disposed entirely within the perimeter of the upper leg; and the input shaft being disposed below the bevel gear.

7. The combination of claim 6, further comprising a nut that operatively connects the gear assembly to the lower tube; the input shaft being disposed between the bevel gear and the nut.

8. A landing gear assembly, comprising:
   an upper leg tube and a lower leg tube; the upper and lower leg tubes being telescopingly disposed with respect to each other;
   the upper tube having a perimeter;
   a gear assembly at least partially disposed within the perimeter of the upper tube;
   an input shaft and a floor base; the floor base being connected to the upper tube; and at least a portion of the input shaft being supported by the floor base;
   a nut connecting the gear assembly to the lower tube; and
   the nut and the lower tube being connected at a location above the connection between the input shaft and the floor base.

9. The assembly of claim 8, further comprising a cover connected to the upper tube; the cover positioning at least a portion of the gear assembly.

10. The assembly of claim 9, wherein the cover includes a first sleeve; a portion of the input shaft being supported by the first sleeve.

11. The assembly of claim 10, further comprising a first bushing disposed between the input shaft and the first sleeve.

12. A landing gear assembly, comprising:
   an upper leg tube and a lower leg tube; the upper and lower leg tubes being telescopingly disposed with respect to each other;
   the upper tube having a perimeter;
   a gear assembly at least partially disposed within the perimeter of the upper tube;
   a cover connected to the upper tube; the cover positioning at least a portion of the gear assembly;
   the cover including a first sleeve; a portion of the input shaft being supported by the first sleeve; and
   the first sleeve engaging the gear assembly to position a portion of the gear assembly in a position spaced from the inner surface of the upper tube.

13. The assembly of claim 12, wherein the gear assembly includes a combination gear and a bevel gear; the combination gear being disposed entirely within the perimeter of the upper leg; and the input shaft being disposed below the bevel gear.

14. The assembly of claim 13, further comprising a nut that operatively connects the gear assembly to the lower tube; the input shaft being disposed between the bevel gear and the nut.

15. In combination:
   a leg for a landing gear assembly for a semitrailer, a mounting bracket, and a mounting surface on a semitrailer;

the leg having a lower tube telescopically received in an upper tube;

a gear assembly being adapted to raise and lower the lower tube with respect to the upper tube;

the upper tube having an input side and an output side; the width of the upper tube being defined between the input side and the output side; the upper tube having a centerline disposed at half of the width;

the upper tube having a perimeter;

the upper tube being configured so that the leg may be mounted to the mounting surface with the mounting bracket in an inboard configuration or an outboard configuration; and the distance between the mounting surface and the centerline of the upper tube being equal in the inboard and outboard mounting configurations.

16. The combination of claim 15, further comprising an input shaft and a floor base; the floor base being connected to the upper tube; and at least a portion of the input shaft being supported by the floor base.

17. The combination of claim 15, wherein the mounting bracket has a pair of substantially coplanar flanges and a seat; the seat being offset from the flanges by a space; the seat of the mounting flange being connected to the upper tube; and a portion of the gear assembly disposed in the space.

18. The combination of claim 16, further comprising an output shaft that exits the upper tube through the output side of the upper tube; the input shaft entering the upper tube through the input side of the upper tube.

19. In combination:

a leg for a landing gear assembly for a semitrailer, a mounting bracket, and a mounting surface on a semitrailer;

the leg having a lower tube telescopically received in an upper tube;

a gear assembly being adapted to raise and lower the lower tube with respect to the upper tube;

the upper tube having an input side and an output side; the width of the upper tube being defined between the input side and the output side; the upper tube having a centerline disposed at half of the width;

the upper tube having a perimeter;

the upper tube being configured so that the leg may be mounted to the mounting surface with the mounting bracket in an inboard configuration or an outboard configuration;

the distance between the mounting surface and the centerline of the upper tube being equal in the inboard and outboard mounting configurations;

an input shaft and a floor base; the floor base being connected to the upper tube; and at least a portion of the input shaft being supported by the floor base; and a nut connecting the gear assembly to the lower tube; a connection between the nut and the lower tube being disposed higher than a connection between the input shaft and the floor base.

20. In combination:

a leg for a landing gear assembly for a semitrailer, a mounting bracket, and a mounting surface on a semitrailer;

the leg having a lower tube telescopically received in an upper tube;

the mounting bracket having a pair of substantially coplanar flanges and a seat; the seat being offset from the flanges by a space; the seat of the mounting bracket being connected to the upper tube; the flanges of the mounting bracket being connected to the mounting surface of the semitrailer;

a gear assembly being adapted to raise and lower the lower tube with respect to the upper tube; and the gear assembly including a plurality of gears; each of the gears having a plurality of gear teeth; at least one of the gears having its gear teeth disposed in the space defined by the mounting bracket.

21. The combination of claim 20, further comprising an input shaft and a floor base; the floor base being connected to the upper tube; and at least a portion of the input shaft being supported by the floor base.

22. The combination of claim 20, further comprising a cover connected to the upper tube; the cover supporting a portion of the gear assembly.

23. In combination:

a leg for a landing gear assembly for a semitrailer, a mounting bracket, and a mounting surface on a semitrailer;

the leg having a lower tube telescopically received in an upper tube;

the mounting bracket having a pair of substantially coplanar flanges and a seat; the seat being offset from the flanges by a space; the seat of the mounting bracket being connected to the upper tube; the flanges of the mounting bracket being connected to the mounting surface of the semitrailer;

a gear assembly being adapted to raise and lower the lower tube with respect to the upper tube;

the gear assembly including a plurality of gears; at least one of the gears disposed in the space defined by the mounting bracket;

an input shaft and a floor base; the floor base being connected to the upper tube; and at least a portion of the input shaft being supported by the floor base; and a nut connecting the gear assembly to the lower tube; a connection between the nut and the lower tube being disposed higher than a connection between the input shaft and the floor base.

* * * * *